United States Patent
Hongo et al.

(10) Patent No.: US 12,066,864 B2
(45) Date of Patent: Aug. 20, 2024

(54) FOLDING-TYPE DISPLAY AND PORTABLE TERMINAL DEVICE

(71) Applicant: TOYOBO CO., LTD., Osaka (JP)

(72) Inventors: Yuki Hongo, Otsu (JP); Mayu Ogawa, Otsu (JP); Akinori Ejima, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 812 days.

(21) Appl. No.: 17/053,501

(22) PCT Filed: Apr. 22, 2019

(86) PCT No.: PCT/JP2019/016980
§ 371 (c)(1),
(2) Date: Nov. 6, 2020

(87) PCT Pub. No.: WO2019/216172
PCT Pub. Date: Nov. 14, 2019

(65) Prior Publication Data
US 2021/0132663 A1   May 6, 2021

(30) Foreign Application Priority Data

May 7, 2018   (JP) .................................. 2018-089320

(51) Int. Cl.
*G06F 1/16* (2006.01)
*B32B 27/36* (2006.01)
(Continued)

(52) U.S. Cl.
CPC ............ *G06F 1/1652* (2013.01); *B32B 27/36* (2013.01); *G02B 1/04* (2013.01); *G02B 1/14* (2015.01)

(58) Field of Classification Search
CPC ......... G06F 1/1652; B32B 27/36; G02B 1/04; G02B 1/14
(Continued)

(56) References Cited

U.S. PATENT DOCUMENTS

| | | | |
|---|---|---|---|
| 2002/0051614 A1* | 5/2002 | Teramoto | G02B 6/138 385/132 |
| 2003/0008162 A1 | 1/2003 | Oya et al. | |

(Continued)

FOREIGN PATENT DOCUMENTS

| | | |
|---|---|---|
| JP | 2002-258760 A | 9/2002 |
| JP | 2005-104140 A | 4/2005 |

(Continued)

OTHER PUBLICATIONS

Japanese Patent Office, International Search Report in International Patent Application No. PCT/JP2019/016980 (Jun. 4, 2019).

(Continued)

*Primary Examiner* — Ruiyun Zhang
(74) *Attorney, Agent, or Firm* — Leydig, Voit & Mayer, Ltd.

(57) ABSTRACT

Provided is a foldable display that is excellent in mass production applicability, and that is resistant to image distortion that can appear in the folding portion after the display is repeatedly folded, and also a mobile device equipped with such a foldable display. The foldable display includes a hard coating film on at least part of the front surface thereof, the hard coating film including a polyester film having an intrinsic viscosity of 0.65 to 1.0 dl/g as a substrate film; a hardened layer formed from a polyimide-based resin, the hardened layer having a thickness of 0.5 to 3.0 μm; and a hard coating layer, wherein the hardened layer and the hard coating layer are present in this order at least on the front surface side of the substrate film.

20 Claims, 1 Drawing Sheet

(51) Int. Cl.
  *G02B 1/04* (2006.01)
  *G02B 1/14* (2015.01)

(58) Field of Classification Search
  USPC ........................................................ 428/1.53
  See application file for complete search history.

(56) References Cited

U.S. PATENT DOCUMENTS

| | | |
|---|---|---|
| 2012/0286649 A1 | 11/2012 | Rajan et al. |
| 2016/0035801 A1 | 2/2016 | Kim |
| 2017/0357289 A1 | 12/2017 | Ahn |
| 2017/0369712 A1* | 12/2017 | Lim .......................... C09D 5/00 |
| 2018/0066152 A1 | 3/2018 | Lee et al. |
| 2018/0088392 A1 | 3/2018 | Park et al. |
| 2018/0118980 A1* | 5/2018 | Robinson ................ B32B 9/005 |

FOREIGN PATENT DOCUMENTS

| | | |
|---|---|---|
| JP | 2010-046898 A | 3/2010 |
| JP | 2014-224894 A | 12/2014 |
| JP | 2015-068996 A | 4/2015 |
| JP | 2016-002764 A | 1/2016 |
| JP | 2016-155124 A | 9/2016 |
| JP | 2017-207699 A | 11/2017 |
| JP | 2018-047691 A | 3/2018 |
| JP | 2018-055098 A | 4/2018 |
| JP | 2018-072663 A | 5/2018 |
| KR | 10-2017-0000668 A | 1/2017 |
| WO | WO 2018/159285 A1 | 9/2018 |

OTHER PUBLICATIONS

Japan Patent Office, Office Action in Japanese Patent Application No. 2019-524290 (May 30, 2023).

* cited by examiner

FOLDING-TYPE DISPLAY AND PORTABLE TERMINAL DEVICE

CROSS-REFERENCE TO RELATED APPLICATIONS

This patent application is the U.S. national phase of International Patent Application No. PCT/JP2019/016980, filed on Apr. 22, 2019, which claims the benefit of Japanese Patent Application No. 2018-089320, filed on May 7, 2018, which are incorporated by reference in their entireties herein.

TECHNICAL FIELD

The present invention relates to foldable displays and mobile devices. The present invention further relates to foldable displays and mobile devices that are resistant to image distortion caused by deformation of the film positioned on the surface, even when the display is repeatedly folded, and that exhibit a high degree of hardness of the film surface.

BACKGROUND ART

Becoming thinner and lighter, mobile devices such as smartphones have become widely prevalent. While being required to have a variety of functions, mobile devices are also required to be convenient to use. It is taken for granted that prevailing mobile devices can be operated with one hand for simple tasks, and can be put into a clothes pocket. Thus, such mobile devices must have a small screen size, such as of about 6 inches.

Tablet devices with a screen size of 7 to 10 inches are intended for use not only for video content and music, but also for business purposes, drawing, and reading; and thus have a high level of functionality. However, these devices cannot be operated with one hand and are not particularly portable, leaving some issues in regards to convenience.

In order to meet these requirements, a technique of making compact devices by connecting multiple displays is suggested. However, due to the remaining bezel portion, the image is divided, and the visibility decreases. Thus, this technique is not commonly used.

More recently, mobile devices equipped with a flexible or foldable display have been proposed. This technique enables one to conveniently carry a mobile device equipped with a large screen display without problems of the image being divided.

Conventional displays and mobile devices that have no folding structure can be protected by a non-flexible material, such as glass, applied to the surface of the display. However, a foldable display that uses a single screen that spans over a folding portion must be protected by a flexible and surface-protectable hard coating film. However, a foldable display is repeatedly folded at a point that is a folding portion, and the film at the point deforms over time, causing image distortion on the display.

A technique of making a difference in thickness between the folded portion and the non-folded portion is also suggested. However, while the flex resistance of the thin portion of the film improves, the pencil hardness of the thin portion of the film decreases (see PTL 1).

CITATION LIST

Patent Literature

PTL 1: JP2016-155124A

SUMMARY OF INVENTION

Technical Problem

The present invention aims to solve the problems that arise in conventional displays as described above. The invention aims to provide a foldable display that is suitable for mass production, that is unlikely to have distortion of images on the folding portion after the display is repeatedly folded, and that has a high degree of hardness; and provide a mobile device equipped with such a foldable display.

Solution to Problem

Specifically, the present invention includes the following subject matter.
Item 1.
A foldable display comprising a hard coating film on at least part of the front surface thereof,
  the hard coating film comprising
    a polyester film having an intrinsic viscosity of 0.65 to 1.0 dl/g as a substrate film,
    a hardened layer formed from a polyimide-based resin, the hardened layer having a thickness of 0.5 to 3.0 µm, and
    a hard coating layer,
wherein the hardened layer and the hard coating layer are present in this order at least on the front surface side of the substrate film.
Item 2.
The foldable display according to Item 1, wherein the polyester film, which is the substrate film, has a thickness of 10 to 75 µm.
Item 3.
The foldable display according to Item 1 or 2, wherein the hard coating layer has a thickness of 1 to 40 µm.
Item 4.
The foldable display according to any one of Items 1 to 3, wherein the hard coating film is placed through the folding portion of the foldable display in a single continuous manner.
Item 5.
The foldable display according to any one of Items 1 to 4, wherein the polyester film is a biaxially oriented polyethylene terephthalate film.
Item 6.
The foldable display according to any one of Items 1 to 5, wherein the hard coating layer has a pencil hardness of 2H or higher as measured under a load of 750 g in accordance with JIS K5600-5-4:1999.
Item 7.
The foldable display according to any one of Items 1 to 6, which has a bend radius of 5 mm or less when folded.
Item 8.
A mobile device comprising the foldable display of any one of Items 1 to 7.

Advantageous Effects of Invention

While maintaining its suitability in mass production, the foldable display according to the present invention is resistant to image distortion at the folding portion of the high-hardness display because the hard coating film positioned on the surface of the display does not deform after being repeatedly folded. A mobile device equipped with such a foldable display provides beautiful images, is resistant to scratches due to its high degree of hardness, and has a variety of functions, while being excellent in convenience such as portability.

DESCRIPTION OF EMBODIMENTS

Display

Figure 1:
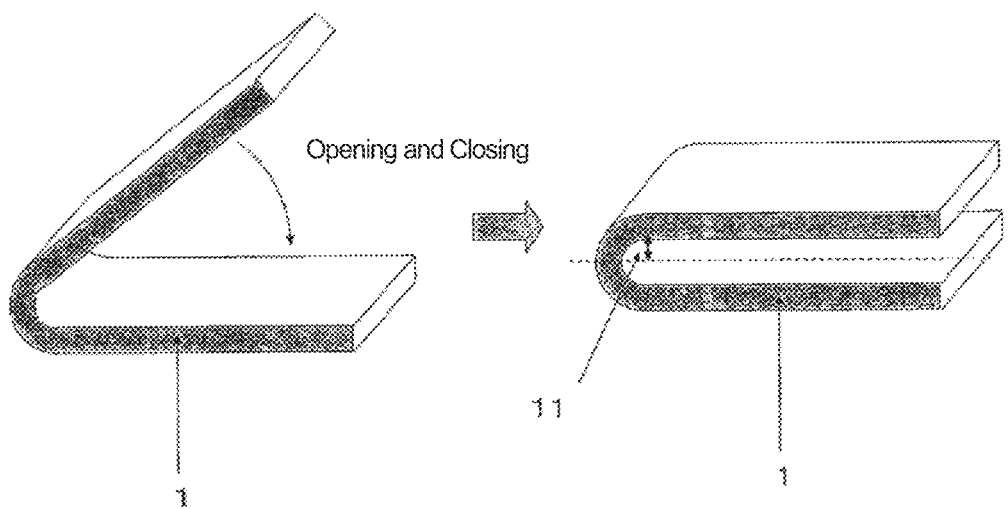
FIG. 1 is a schematic diagram showing a point at which the bend radius of the foldable display according to the present invention being folded is measured.

The term "display" as used in the present invention refers to display devices in general. There are several types of displays, such as LCDs, organic EL displays, inorganic EL displays, LEDs, and FEDs; however, LCDs, organic ELs, and inorganic ELs, which have a foldable structure, are preferable. In particular, organic EL displays and inorganic EL displays, which can reduce the layer structure, are preferable; and organic EL displays, which have a wide color gamut, are even more preferable.

Foldable Display

A foldable display preferably has enhanced portability with such a structure that a single continuous display is folded in half, or three or more when carried, thus reducing its size by half or even more. At the same time, the foldable display is preferably thin and lightweight. Thus, the foldable display preferably has a bend radius of 5 mm or less, and more preferably 3 mm or less. A bend radius of 5 mm or less enables the foldable display to be thin when folded. A smaller bend radius is better; however, the bend radius can be 0.1 mm or more, or even 0.5 mm or more. Even a bend radius of 1 mm or more ensures sufficient practical use compared with conventional displays with no such foldable structure. The bend radius of a folded device being folded is measured at the point marked with reference numeral 11 in the schematic diagram of FIG. 1, and refers to the inner radius of the folding portion of the device being folded.

Organic EL

A typical structure of organic EL displays includes an organic EL layer composed of an electrode, an electron transport layer, a light-emitting layer, a hole transport layer, and a transparent electrode; a retardation film for improving image quality; and a polarizer.

Mobile Device with Touchscreen

When, for example, an organic EL display is used in a mobile device equipped with a touchscreen, a touchscreen module is placed on top of the organic EL display, or between the organic EL layer and the retardation film. Because a shock applied from above may break the circuit of the organic EL display and the touchscreen, it is preferable to provide a film for protecting the surface. At least part of the surface of the foldable display is preferably provided with a hard coating film as a film for protecting its surface thereof, and it is preferred that this mainly includes the surface of the image-display portion of the foldable display. The hard coating layer is preferably positioned on the outer surface side of the display.

The image-display portion of the foldable display may be positioned on the inner side or on the outer side when the display is folded. In other words, the hard coating film, which is a film for protecting the front surface of the foldable display according to the present invention, may be positioned on the inner surface or on the outer surface of the folded display.

In the present invention, the hard coating film provided to at least part of the front surface of the foldable display preferably contains a hardened layer formed from a polyimide-based resin and a hard coating layer that are stacked in this order on at least one side of the substrate film.

The substrate film that constitutes the hard coating film for use can be those that have high light transmittance with low haze, such as polyimide films, polyester films, polycarbonate films, acrylic films, triacetyl cellulose films, and cycloolefin polymer films. Of these, polyimide films and polyester films, which have high shock resistance and sufficient pencil hardness, are preferable; and polyester films, which can be manufactured at low cost, are particularly preferable.

Figure 2:
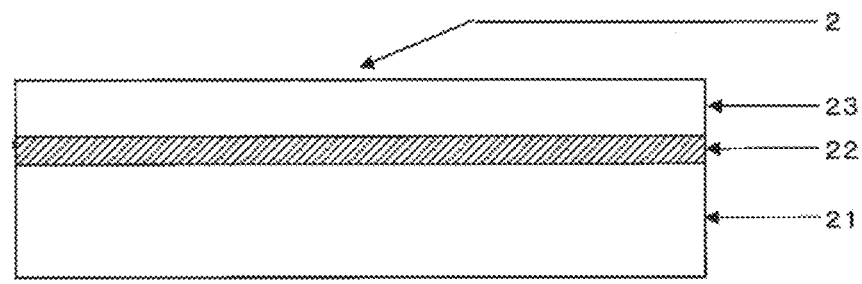
FIG. 2 is a schematic diagram showing the cross section of the hard coating film according to an embodiment of the present invention.

FIG. 2 is a schematic diagram of the cross section of the hard coating film according to an embodiment of the present invention. The hard coating film preferably contains a hardened layer formed from a polyimide resin (reference numeral 22) and a hard coating layer (reference numeral 23) that are stacked in this order on the polyester film (reference numeral 21) as a substrate film. The hard coating film is preferably positioned as the surface of the foldable display, and the hard coating layer is preferably positioned as the outer surface of the foldable display. Although not shown, the surface of the hard coating layer (reference numeral 23) typically is the surface of the foldable display.

In the present invention, the polyester film, which serves as a substrate film of the hard coating film, may be a monolayered film composed of one or more types of polyester resins. If two or more types of polyester are used, the polyester film may be a multilayered film or ultra-multilayered lamination film with a repeating structure.

Examples of polyester resins includes polyethylene terephthalate, polybutylene terephthalate, polyethylene-2,6-naphthalate, and polyester films composed of copolymers that contain the constituent components of these resins as the main component. In particular, from the standpoint of mechanical properties, heat resistance, transparency, and price, biaxially oriented polyethylene terephthalate films are particularly preferable.

When a polyester copolymer is used in the substrate film, the dicarboxylic acid component of the polyester can be, for example, aliphatic dicarboxylic acids, such as adipic acid and sebacic acid; aromatic dicarboxylic acids, such as terephthalic acid, isophthalic acid, phthalic acid, and 2,6-naphthalene dicarboxylic acid; or multifunctional carboxylic acids, such as trimellitic acid, and pyromellitic acid. The glycol component can be, for example, fatty acid glycols, such as ethylene glycol, diethylene glycol, 1,4-butanediol, propylene glycol, and neopentyl glycol; aromatic glycols, such as p-xylene glycol; alicyclic glycols, such as 1,4-cyclohexanedimethanol; or polyethylene glycols with an average molecular weight of 150 to 20,000. The mass ratio of copolymer component of the copolymer is preferably less than 20 mass %. A mass ratio of less than 20 mass % is preferable because film strength, transparency, and heat resistance are retained.

In the production of a polyester film, at least one type of resin pellet preferably has an intrinsic viscosity of 0.65 to 1.0 dl/g. An intrinsic viscosity of 0.65 dl/g or more is preferable because such an intrinsic viscosity leads to the obtained film being resistant to deformation after being repeatedly folded, without deteriorating image quality. An intrinsic viscosity of 1.00 dl/g or less is preferable because it prevents filtration pressure of the molten fluid from becoming too high, thus making it easier to stably operate film production.

Regardless of whether the film is a monolayer or a laminate, the film preferably has an intrinsic viscosity of 0.65 dl/g or more, and more preferably 0.68 dl/g or more. An intrinsic viscosity of 0.65 dl/g or more provides sufficient flex resistance. An intrinsic viscosity of 1.00 dl/g or less is preferable because it enables excellent operability in production.

The polyester film preferably has a thickness of 10 to 75 μm, and more preferably 25 to 75 μm. A thickness of 10 μm or more is preferable because it provides a pencil hardness improvement effect; and a thickness of 75 μm or less is preferable because it is advantageous in weight reduction, and provides excellent flexibility, processability, and handling.

The surface of the polyester film according to the present invention may be smooth or uneven. However, decreased optical properties due to unevenness are not preferable because the film is used for covering the surface of a display. The haze is preferably 3% or less, more preferably 2% or less, and most preferably 1% or less. A haze of 3% or less can improve the visibility of images. Although a lower haze is better, the lower limit of haze may be 0.1% or more, or 0.3% or more.

Given the purpose of reducing haze as described above, the surface of the film should not be too uneven. However, to provide the film with moderate slipperiness for good handling, unevenness may be formed on the film surface by adding filler to the polyester resin layer of the surface layer, or by applying a filler-containing coating layer to the polyester resin layer during the film-forming process.

The method for adding particles to a polyester film for use can be a known method. For example, particles can be added at any stage of polyester production and can be preferably added in the form of slurry prepared by dispersing the particles in, for example, ethylene glycol in the esterification stage, after the completion of transesterification, or before the start of polycondensation to facilitate polycondensation. Alternatively, particles can be added by a method of blending slurry prepared by dispersing particles in ethylene glycol or water with a polyester material by using a kneading extruder equipped with a vent, or a method of blending dry particles with a polyester material by using a kneading extruder.

In particular, preferable is a method of homogeneously dispersing the aggregates of inorganic particles in a monomer solution, which is part of a polyester material, then filtering the dispersion, and adding the filtrate to the remainder of the polyester material before, during, or after esterification. Due to the low viscosity of the monomer solution, this method enables homogeneous dispersion of particles and high-precision filtration of the slurry in a simple manner while ensuring excellent particle dispersibility and low likeliness of the occurrence of new aggregates when particles are added to the remainder of the polyester material. From this viewpoint, it is particularly preferable to add particles to the remainder of the polyester material at a low temperature before esterification.

Additionally, the number of protrusions on the surface of the film can be further reduced by a method of preparing a particle-containing polyester beforehand, and kneading and extruding pellets of the particle-containing polyester with particle-free pellets (master batch method).

The polyester film may contain various additives to the degree that light transmittance is satisfactory. Examples of additives include an antistatic agent, a UV absorber, and a stabilizer.

The polyester film has a total light transmittance of preferably 85% or more, and more preferably 87% or more. A transmittance of 85% or more sufficiently ensures visibility. Although a higher total light transmittance of the polyester film is better, the total light transmittance can be 99% or less, or 97% or less.

The surface of the polyester film according to the present invention can be subjected to treatment for improving adhesion with a resin for forming, for example, a hardened layer of polyimide-based resin.

Examples of surface treatment methods include unevenness formation treatment by sandblasting, solvent treatment, etc.; and oxidation treatment such as corona discharge, electron beam irradiation, plasma treatment, ozone/UV irradiation, flame treatment, chromic acid treatment, and hot air treatment. These methods can be used without any restriction.

Although not shown in FIG. 2, it is preferred that an easy-to-adhere layer be stacked on the polyester film; adhesion can also be improved by an adhesion-improving layer, such as an easy-to-adhere layer. The easy-to-adhere layer for use without any restriction includes acrylic resins, polyester resins, polyurethane resins, and polyether resins. The easy-to-adhere layer can be formed by a typical coating technique, preferably an in-line coating technique.

The polyester film described above can be produced, for example, by performing a polymerization step of homogenously dispersing inorganic particles in a monomer solution, which is part of a polyester material, filtering the dispersion, and adding the filtrate to the remainder of the polyester material to polymerize a polyester; and a film-forming step of melting and extruding the polyester into a sheet form through a filter, and cooling and drawing the sheet to form a base film.

Below, the method for producing a polyester film is described in detail with an example in which pellets of polyethylene terephthalate ("PET" below) are used as the material of a base film. However, the method is not limited to this example. Additionally, the example is not intended to limit the number of layers such as a monolayer or a multilayer.

After a predetermined proportion of PET pellets are mixed and dried, the mixture is fed to a known extruder for melting and laminating, and then extruded from the slit die into a sheet form, followed by cooling and solidifying the sheet on a casting roll to form an unstretched film. A monolayer can be produced with a single extruder. A multilayered film can be produced by laminating multiple film layers that constitute each outermost layer using two or more extruders, two or more multilayered manifolds, or a confluence block (e.g., confluence blocks with a square joint), extruding a sheet composed of two or more layers from the outlet, and cooling the sheet on a casting roll to prepare an unstretched film.

In this case, it is preferable to perform high-precision filtration to remove foreign matter that may be present in the resin in any place in which the molten resin is maintained at about 280° C. during melt-extrusion. The filter material for use in high-precision filtration of a molten resin can be any material; however, a filter material made of sintered stainless steel is preferable because it is excellent in removing aggregate composed mainly of Si, Ti, Sb, Ge, or Cu and organic matter with a high melting point.

Additionally, the particle size filtered through the filter material (initial filtration efficiency: 95%) is preferably 20 µm or less, and particularly preferably 15 µm or less. A filtered particle size (initial filtration efficiency: 95%) exceeding 20 µm may lead to insufficient removal of foreign matter with a size of 20 µm or more. Although high-precision filtration of molten resin using a filter with a filtered particle size of 20 µm or less (initial filtration efficiency: 95%) may reduce productivity, such a filter is preferable from the standpoint of obtaining a film that has fewer protrusions caused by coarse particles.

Specifically, for example, after the pellets of PET are sufficiently dried in vacuum, the pellets are fed into an extruder, and then melted and extruded in a sheet form at about 280° C., followed by cooling and solidifying the sheet to form an unstretched PET sheet. The obtained unstretched sheet is drawn 2.5- to 5.0-fold with rolls heated to 80 to 120° C. to obtain a uniaxially oriented PET film. The film is then held with clips at its ends and guided to a hot-air zone heated to 80 to 180° C., and dried, followed by drawing 2.5- to 5.0-fold in the width direction. Subsequently, the film is guided to a heat treatment zone at 160 to 240° C. and treated with heat for 1 to 60 seconds, thereby completing crystalline orientation. During the heat treatment step, the film may optionally be subjected to relaxation treatment by 1 to 12% in the width or longitudinal direction.

Hardened Layer of Polyimide-Based Resin

The polyester film positioned on the surface of the foldable display to protect the display preferably contains a hardened layer formed from a polyimide-based resin between the polyester film and the hard coating layer. The polyimide-based resin includes polyimide resins and polyamide-imide resins, and is preferably a resin having a reactive functional group. The presence of a reactive functional group is preferable because it provides the effects that a crosslinked structure is formed, that elasticity of a coating film improves, and that pencil hardness improves.

The polyimide resin is also available in its solution form. Examples of polyimide resin solutions include HCI series (polyamic-acid polyimide resin, Hitachi Chemical Co., Ltd.) and Neopulim (registered trademark, Mitsubishi Gas Chemical Company, Inc.). Examples of polyamide-imide resin solutions include Vylomax (registered trademark, Toyobo Co., Ltd.) and HPC series (polyamide-imide resins, Hitachi Chemical Co., Ltd.).

Crosslinking Agent

To cure the polyimide-based resin, a crosslinking agent can be preferably used in combination. The crosslinking agent for use without particular limitation includes isocyanate-based crosslinking agents, epoxy-based crosslinking agents, chelate-based crosslinking agents, aziridine-based crosslinking agents, and oxazoline-based crosslinking agents.

Additive

Additionally, additives, such as an adhesion-improving material for improving the adhesion with the hard coating layer and/or an ultraviolet absorber for improving light resistance, as well as filler, can be added.

Film Thickness

The hardened layer formed from a polyimide-based resin preferably has a film thickness of 0.5 to 3 µm. A thickness of 0.5 µm or more is preferable because such a thickness makes an effect of improving pencil hardness more noticeable. A thickness of 3 µm or less is preferable because such a thickness makes an effect of improving pencil hardness more noticeable without reducing flex resistance.

Coating Method

The method for applying a hardened layer of a polyimide-based resin for use without particular limitation may be, for example, meyer bar, gravure coating, die coater, or knife coater; and can be suitably selected according to the viscosity and film thickness.

Curing Conditions

The method for curing the polyamide-imide layer for use may be a curing method suitable for the crosslinking agent, such as a curing method using energy beams such as ultraviolet rays or electron beams, or heat. In curing the polyamide-imide layer with heat, the temperature is preferably 150° C. or less, and particularly preferably 130° C. or less.

Hard Coating Layer

The polyester film for protecting a foldable display by positioning on the front surface of the display preferably has a hard coating layer on the surface of the film. The resin for forming a hard coating layer can be any resin, without particular limitations, such as (meth)acrylate-based resins, siloxane-based resins, inorganic hybrid-based resins, urethane (meth)acrylate-based resins, polyester (meth)acrylate-based resins, and epoxy-based resins. These resins may be used in a combination of two or more, or may contain particles such as inorganic filler or organic filler.

Film Thickness

The film thickness of the hard coating layer is preferably 1 to 40 µm. A film thickness of 1 µm or more is preferable due to excellent pencil hardness. A film thickness of 40 µm or less suppresses curling caused by hardening and contraction of the hard coating, thus improving film handling.

Coating Method

The method for applying a hard coating layer for use, without particular limitation, may be, for example, meyer bar, gravure coating, die coater, or knife coater; and can be suitably selected according to the viscosity and film thickness.

Curing Conditions

The method for curing the hard coating layer for use may be a curing method using energy beams such as ultraviolet rays or electron beams, or heat. To reduce damage to the film, ultraviolet rays or electron beams are preferable.

Pencil Hardness

The pencil hardness of the hard coating layer of the hard coating film is preferably 2H or higher, and more preferably 3H or higher. A pencil hardness of 2H or higher prevents the hard coating layer from being easily scratched without decreasing visibility. Although a higher degree of pencil hardness of the hard coating layer is generally better, the pencil hardness may be 10H or lower or 8H or lower; even a hard coating layer with a pencil hardness of 6H or lower is usable in practice without problems.

Type of Hard Coating Layer

The hard coating layer of the present invention may have other functions added as long as the hard coating layer can be used in protecting the display by increasing the pencil hardness of the surface as described above. For example, a hard coating layer that has a predetermined pencil hardness as described above and has functionality added, such as an antiglare layer, an antiglare antireflection layer, an antireflection layer, a low reflection layer, and an antistatic layer, can also be preferably used in the present invention.

The hard coating film of the present invention preferably has a haze of 3% or less, more preferably 2% or less, and most preferably 1% or less, as with the polyester film. A haze of 3% or less can improve the visibility of images. Although a lower haze is better, the lower limit of haze may be 0.1% or more, or 0.3% or more.

The hard coating film of the present invention has a total light transmittance of preferably 85% or more, and more preferably 87% or more, as with the polyester film. A transmittance of 85% or more sufficiently ensures visibility. Although a higher total light transmittance of the hard coating film is better, the total light transmittance can be 99% or less, or 97% or less.

EXAMPLES

Below, the effects of the present invention will be described with reference to Examples and Comparative Examples. First, the evaluation method for the characteristic values used in the present invention is explained.

(1) Intrinsic Viscosity

A film or polyester resin was pulverized and dried, and then dissolved in a mixture solvent of phenol and tetrachloroethane (phenol/tetrachloroethane=60/40 in mass ratio). After this solution was centrifuged to remove inorganic particles, the flow time of the solution with a concentration of 0.4 (g/dl) at 30° C. and the flow time of the solvent alone were measured with an Ubbelohde viscometer. From the ratio of flow time between them, the intrinsic viscosity was calculated using the Huggins equation, based on the assumption that the constant of the Huggins equation was 0.38. In the case of a laminated film, the intrinsic viscosity of each individual layer was evaluated by scraping off the polyester layer of the film, depending on the thickness of the laminate.

(2) Flex Resistance

A sample (width direction: 50 mm×flow direction: 100 mm) was prepared. The sample was bent 50,000 times at a rate of 1 time/second using a tension-free folding clamshell jig (DLDMLH-FS, produced by Yuasa System. Co., Ltd.), with the bend radius set to 3 mm. In this process, the sample was fixed at the point of 10 mm from both end portions of the long side, and the portion to be bent was 50 mmm×80 mm. After completion of the bending treatment, the sample was placed on a flat surface with the inner side of the folded sample down, and visually inspected.

In the following Examples and Comparative Examples, the flex resistance of hard coating films was evaluated. Evaluation was performed with a hard coating film bent so that the hard coating layer comes outward.

A: No deformation was observed in the sample.
B: Deformation was observed in the sample. However, when placed horizontally, the sample rose at a maximum height of less than 5 mm.
C: A folded mark was observed in the sample, or when placed horizontally, the sample rose at a maximum height of 5 mm or more.

(3) Pencil Hardness

A hard coating layer of a hard coating film was measured at a rate of 0.5 mm/s under a load of 750 g in accordance with JIS K 5600-5-4:1999.

(4) Total Light Transmittance and Haze

A hard coating film were measured with a haze meter (Nippon Denshoku Industries Co., Ltd., NDH5000).

(5) Thickness of Polyester Film

Three samples (5-cm square) were cut out from three freely selected parts of a film. The thickness was measured at five points per sample (15 points in total) with an electric micrometer (Millitron 1245D, manufactured by Feinprüf), and the average was determined to be the thickness of the polyester film.

(6) Thickness of Hardened Layer Formed from Polyimide-Based Resin and Thickness of Hard Coating Layer Sections were cut out from three freely selected parts of a hard coating film. The surface of the end plane of one side per section was made homogeneous with a microtome. The end plane was observed with an RH-2000 digital microscope (Hirox Co., Ltd.) at 600× magnification. The thickness of the hardened layer formed from a polyimide-based resin and the thickness of the hard coating layer were measured at five points per end plane (15 points in total), and the average of each thickness was calculated.

Preparation of Polyimide-based Resin Coating Composition 1 100 parts by weight of a polyamide-imide resin solution (Toyobo Co., Ltd., Vylomax (registered trademark) HR-15ET, solids concentration: 25%) and 2.5 parts by weight of a crosslinking agent (Mitsubishi Gas Chemical Company, Inc., trade name: TETRAD X, solids concentration: 100 wt %) were mixed, and the mixture was diluted with a solvent (toluene/MEK=1/1), thereby preparing coating composition 1 with a concentration of 15%.

Preparation of Hard Coating Composition 2

95 parts by weight of an urethane-acrylate-based hard coating agent (Arakawa Chemical Industries, Ltd., BEAM-SET (registered trademark) 577, solids concentration: 100%), 5 parts by weight of a radical photopolymerization initiator (IGM Resins, trade name: Omnirad 907, solids concentration: 100 wt %), and 0.1 parts by weight of a leveling agent (BYK-Chemie Japan, BYK307, solids concentration: 100%) were mixed, and the mixture was diluted with a solvent (toluene/MEK=1/1), thereby preparing coating composition 1 with a concentration of 40%.

Preparation of Polyethylene Terephthalate Pellet (a)

A continuous esterification reactor composed of a three-stage complete mixing vessel equipped with a stirrer, a condenser, a raw material feeder, and a product extraction port was used as an esterification reactor. A slurry of TPA (2 tons/hr), EG (2 mol per mol of TPA), and antimony trioxide (160 ppm of Sb atoms based on produced PET) was continuously supplied to the first esterification reaction unit of the esterification reactor and was allowed to react at 255° C. for an average residence time of 4 hours under ambient pressure. Subsequently, the reaction product in the first esterification reaction unit was continuously taken outside of the system and supplied to the second esterification reaction unit. EG evaporated from the first esterification reaction unit (8 mass % of the produced polymer (produced PET)) was supplied to the second esterification reaction unit. Additionally, an EG solution containing magnesium acetate such that the amount of Mg atoms was 65 ppm based on the produced PET and an EG solution containing TMPA such that the amount of P atoms was 20 ppm based on the produced PET were added thereto, and the mixture was reacted at 260° C. for an average residence time of 1.5 hours under ambient pressure. Subsequently, the reaction product in the second esterification reaction unit was continuously taken outside of the system and supplied to the third esterification reaction unit. An EG solution containing TMPA such that the amount of P atoms was 20 ppm based on the produced PET was further added thereto, followed by reaction at 260° C. for an average residence time of 0.5 hours under ambient pressure. The esterification reaction product generated in the third esterification reaction unit was continuously supplied to a three-stage continuous polycondensation reactor to perform polycondensation, followed by filtration through a sintered stainless steel filtration material (nominal filtration accuracy: 5-μm particles are 90% cut), thereby obtaining polyethylene terephthalate pellet (a) with an intrinsic viscosity of 0.62 dl/g.

Preparation of Polyethylene Terephthalate Pellet (b)

Polyethylene terephthalate pellet (a) was subjected to solid-phase polymerization at 220° C. under reduced pressure of 0.5 mmHg with a rotary vacuum polymerization apparatus while the reaction time was changed, thereby preparing polyethylene terephthalate pellet (b) with an intrinsic viscosity of 0.67 dL/g.

Preparation of Polyethylene Terephthalate Pellet (c)

Polyethylene terephthalate pellet (a) was subjected to solid-state polymerization under reduced pressure of 0.5 mmHg at 220° C. with a rotary vacuum polymerization apparatus while the reaction time was changed, thereby preparing polyethylene terephthalate pellet (c) with an intrinsic viscosity of 0.75 dl/g.

Preparation of Polyethylene Terephthalate Pellet (d)

Polyethylene terephthalate pellet (a) was subjected to solid-state polymerization under reduced pressure of 0.5 mmHg at 220° C. with a rotary vacuum polymerization apparatus while the reaction time was changed, thereby preparing polyethylene terephthalate pellet (d) with an intrinsic viscosity of 0.83 dl/g.

Polyethylene terephthalate master pellet (a) was dried at 180° C. for 8 hours under reduced pressure (3 Torr), and polyethylene terephthalate pellet (a) was supplied to each extruder, followed by melting at 285° C. This polymer was filtered through a sintered stainless steel filter material (nominal filtration accuracy: 10-μm particles are 95% cut) and extruded from the outlet into a sheet form. The sheet-form polymer was then brought into contact with a casting drum (surface temperature 30° C.) by using an electrostatic application casting method to solidify the polymer by cooling, thereby preparing an unstretched film. The unstretched film was drawn 3.4-fold at 85° C. in the longitudinal direction. This uniaxially stretched film was drawn 4.2-fold at 95° C. in the width direction using a tenter, and subjected to heat treatment at 220° C. for 5 seconds, thereby obtaining polyethylene terephthalate film No. 1 shown in Table 1. Polyethylene terephthalate master pellets (b) to (d) were supplied to substantially the same steps as those described above, except for some adjustment of conditions, thereby obtaining polyethylene terephthalate films Nos. 2 to 5 shown in Table 1.

Example 1

Polyimide-based resin coating composition 1 was applied to one surface of polyethylene terephthalate film No. 3 by using meyer bar such that the film thickness after drying was 2.0 μm, and dried at 120° C. for 1 minute, thereby obtaining a hardened layer formed from a polyimide-based resin. Subsequently, hard coating composition 2 was applied to the hardened layer formed from a polyimide-based resin by using meyer bar such that the film thickness after drying was 10 μm, and dried at 80° C. for 30 seconds, followed by irradiation with ultraviolet rays (integrated light intensity: 200 mJ/cm$^2$), thereby obtaining a hard coating film.

Examples 2 to 5 and Comparative Examples 1 to 3

Hard coating films were prepared in the same manner as in Example 1 under the conditions described in Table 2.

Each of these prepared films was laminated to an organic EL module via a 25-μm-thick adhesive layer, thereby preparing a smartphone-type foldable display that is foldable in half in the middle, with a radius of 3 mm, which corresponds to the bend radius in FIG. 1. The hard coating film was placed on the surface of a single continuous display through the folding portion, and the hard coating layer was placed so as to be the front surface of the display. The displays prepared by using the hard coating films of the Examples were all satisfactory in operation and visibility as a smartphone that can be folded in half in the middle and carried. However, the foldable displays prepared by using the hard coating films of Comparative Examples 2 and 3 were not particularly preferred because they appeared to begin having image distortion in the folding portion as they were used frequently. Comparative Example 1 was somewhat unsatisfactory in terms of the pencil hardness of the hard coating film.

TABLE 1

| | PET Pellet | | PET Film | |
|---|---|---|---|---|
| No. | Type | Intrinsic Viscosity (dl/g) | Intrinsic Viscosity (dl/g) | Film Thickness (μm) |
| 1 | (a) | 0.62 | 0.60 | 50 |
| 2 | (b) | 0.67 | 0.65 | 50 |
| 3 | (c) | 0.75 | 0.73 | 50 |
| 4 | (d) | 0.83 | 0.80 | 50 |
| 5 | (c) | 0.75 | 0.73 | 38 |

TABLE 2

| | Hard Coating Film | | | | | | | |
|---|---|---|---|---|---|---|---|---|
| | PET Film | | Hardened Layer Formed from Polyimide Resin | Hard Coating Layer | Evaluation Results | | | |
| | No. | Intrinsic Viscosity (dl/g) | Film Thickness (μm) | Film Thickness (μm) | Film Thickness (μm) | Flex Resistance | Transmittance (%) | Haze (%) | Pencil Hardness (—) |
| Example 1 | 3 | 0.73 | 50 | 2 | 10.0 | A | 88.7 | 0.3 | 4H |
| Example 2 | 5 | 0.73 | 38 | 2 | 10.0 | A | 88.9 | 0.3 | 3H |
| Example 3 | 3 | 0.73 | 50 | 1 | 10.0 | A | 88.7 | 0.3 | 3H |
| Example 4 | 4 | 0.80 | 50 | 2 | 5.0 | A | 88.8 | 0.3 | 3H |
| Example 5 | 2 | 0.65 | 50 | 2 | 5.0 | B | 88.6 | 0.3 | 2H |

TABLE 2-continued

| | | Hard Coating Film | | | | | | |
|---|---|---|---|---|---|---|---|---|
| | | PET Film | | Hardened Layer Formed from Polyimide Resin | Hard Coating Layer | Evaluation Results | | |
| | No. | Intrinsic Viscosity (dl/g) | Film Thickness (μm) | Film Thickness (μm) | Film Thickness (μm) | Flex Resistance | Transmittance (%) | Haze (%) | Pencil Hardness (—) |
| Comparative Example 1 | 2 | 0.65 | 50 | 0.3 | 5.0 | B | 88.6 | 0.3 | H |
| Comparative Example 2 | 1 | 0.60 | 50 | 2 | 5.0 | C | 88.5 | 0.3 | 3H |
| Comparative Example 3 | 3 | 0.73 | 50 | 4 | 10.0 | C | 88.7 | 0.3 | 3H |

INDUSTRIAL APPLICABILITY

The present invention provides a foldable display that has a high degree of pencil hardness on its surface, is resistant to deformation of the surface of the hard coating film when repeatedly folded, and is resistant to image distortion that occurs over time, while maintaining mass production applicability; and provides a mobile device equipped with such a foldable display.

DESCRIPTION OF THE REFERENCE NUMERALS

1: foldable display
11: bend radius
2: hard coating film
21: polyester film
22: hardened layer formed from a polyimide-based resin
23: hard coating layer

The invention claimed is:

1. A foldable display comprising a hard coating film on at least part of the front surface thereof, the hard coating film comprising
  a polyester film having an intrinsic viscosity of 0.65 to 1.0 dL/g as a substrate film,
  a hardened layer formed from a polyimide-based resin, the hardened layer having a thickness of 0.5 to 3.0 μm, and
  a hard coating layer, wherein
  the hardened layer and the hard coating layer are present in this order at least on the front surface side of the substrate film,
  the intrinsic viscosity is calculated based on the flow time of a solution with a concentration of 0.4 (g/dL) at 30° C. measured with an Ubbelohde viscometer, wherein the solution is obtained by pulverizing, drying, and then dissolving the polyester film in a solvent mixture of phenol and tetrachloroethane in a mass ratio of 60:40 phenol:tetrachloroethane followed by a centrifugation to remove inorganic particles,
  the polyimide-based resin comprises a polyimide resin or a polyamide-imide resin,
  the polyester film has a thickness of 10 to 75 μm,
  an easy-to-adhere layer for improving adhesion with the hardened layer of polyimide-based resin is stacked on the polyester film, and
  the easy-to-adhere layer comprises an acrylic resin, a polyester resin, a polyurethane resin, or a polyether resin.

2. The foldable display according to claim 1, wherein the hard coating layer has a thickness of 1 to 40 μm.

3. The foldable display according to claim 1, wherein the hard coating film is placed through the folding portion of the foldable display in a single continuous manner.

4. The foldable display according to claim 1, wherein the polyester film is a biaxially oriented polyethylene terephthalate film.

5. The foldable display according to claim 1, wherein the hard coating layer has a pencil hardness of 2H or higher as measured under a load of 750 g in accordance with JIS K5600-5-4:1999.

6. The foldable display according to claim 1, which has a bend radius of 5 mm or less when folded.

7. A mobile device comprising the foldable display of claim 1.

8. The foldable display according to claim 1, wherein the hard coating film has a total light transmittance of 85% or more and a haze of 3% or less.

9. The foldable display according to claim 8, wherein the hard coating layer is formed from a urethane-acrylate-based resin.

10. The foldable display according to claim 2, wherein the hard coating film has a total light transmittance of 85% or more and a haze of 3% or less.

11. The foldable display according to claim 10, wherein the hard coating layer is formed from a urethane-acrylate-based resin.

12. The foldable display according to claim 1, wherein the hard coating layer is formed from a urethane-acrylate-based resin.

13. The foldable display according to claim 2, wherein the hard coating layer is formed from a urethane-acrylate-based resin.

14. The foldable display according to claim 1, wherein the foldable display (a) rises at a maximum height of less than 5 mm or (b) is not deformed when placed horizontally on a flat surface with the inner side of the foldable display facing downward after completion of the bending treatment, in which the foldable display is bent 50,000 times at a rate of 1 time/second using a tension-free folding clamshell jig, with the bend radius set to 3 mm and the hard coating layer facing outward.

15. The foldable display according to claim 6, wherein the foldable display (a) rises at a maximum height of less than 5 mm or (b) is not deformed when placed horizontally on a flat surface with the inner side of the foldable display facing downward after completion of the bending treatment, in which the foldable display is bent 50,000 times at a rate of 1 time/second using a tension-free folding clamshell jig, with the bend radius set to 3 mm and the hard coating layer facing outward.

16. A mobile device comprising the foldable display of claim 15.

17. A mobile device comprising the foldable display of claim 2.

18. A mobile device comprising the foldable display of claim 4.

19. A mobile device comprising the foldable display of claim 6.

20. A mobile device comprising the foldable display of claim 9.

\* \* \* \* \*